(12) United States Patent
Eguchi

(10) Patent No.: US 8,077,429 B2
(45) Date of Patent: Dec. 13, 2011

(54) MAGNETIC DISK VIBRATION-SUPPRESSING MECHANISM HAVING SHROUD-NARROWING GAP

(75) Inventor: Takehiko Eguchi, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 821 days.

(21) Appl. No.: 11/724,589

(22) Filed: Mar. 14, 2007

(65) Prior Publication Data
US 2007/0230038 A1 Oct. 4, 2007

(30) Foreign Application Priority Data
Mar. 14, 2006 (JP) .................................. 2006-068723

(51) Int. Cl.
*G11B 33/14* (2006.01)
*G11B 25/04* (2006.01)
(52) U.S. Cl. .................................................. 360/97.02
(58) Field of Classification Search .............. 360/97.01, 360/97.02, 97.03, 98.01
See application file for complete search history.

(56) References Cited

U.S. PATENT DOCUMENTS

| | | | | |
|---|---|---|---|---|
| 3,720,931 A | * | 3/1973 | Andersen | 360/97.03 |
| 4,712,146 A | * | 12/1987 | Moon et al. | 360/97.03 |
| 5,396,384 A | * | 3/1995 | Caldeira et al. | 360/98.01 |
| 6,665,139 B2 | | 12/2003 | Tokuyama et al. | |
| 2002/0008934 A1 | * | 1/2002 | Tadepalli et al. | 360/97.02 |
| 2002/0021527 A1 | * | 2/2002 | Rannow et al. | 360/97.02 |
| 2003/0058574 A1 | * | 3/2003 | Nishijima et al. | 360/97.02 |
| 2003/0081350 A1 | * | 5/2003 | Wang et al. | 360/97.02 |
| 2003/0107839 A1 | | 6/2003 | Smith | 360/97.02 |
| 2003/0137769 A1 | * | 7/2003 | Wang et al. | 360/97.02 |
| 2003/0169531 A1 | * | 9/2003 | Wang et al. | 360/97.02 |
| 2003/0210492 A1 | * | 11/2003 | Adams et al. | 360/97.02 |
| 2004/0184180 A1 | * | 9/2004 | Tadepalli et al. | 360/75 |
| 2004/0212920 A1 | * | 10/2004 | Tadepalli et al. | 360/97.02 |
| 2007/0157588 A1 | * | 7/2007 | Dauber et al. | 55/385.6 |

FOREIGN PATENT DOCUMENTS

| | | | |
|---|---|---|---|
| JP | 52134713 A | * | 11/1977 |
| JP | 60136984 A | * | 7/1985 |
| JP | 11-232866 | | 8/1999 |
| JP | 2000-228079 | | 8/2000 |
| JP | 2000-331460 | | 11/2000 |
| JP | 2004-234784 | | 8/2004 |

* cited by examiner

*Primary Examiner* — Craig A. Renner

(57) ABSTRACT

Embodiments in accordance with the present invention relate to greatly decreasing vibrations of a rotary disk at a portion where vibration on the disks is to be suppressed in a vibration-suppressing mechanism for rotary disks while enabling the rotary disks to be incorporated in the shroud surface. In one embodiment, the vibration-suppressing mechanism for rotary disks comprises at least one rotary disk and a shroud surface extending along and facing the outer circumferential edges of the disk. The shroud surface is so formed as to possess a portion where a gap between the outer circumferential edge of the disk and the shroud surface becomes small near a portion where the vibration of the disk is to be suppressed.

17 Claims, 11 Drawing Sheets

(0, 0) MODE (0, 1) MODE (a)

(b)

MAGNETIC DISK VIBRATION-SUPPRESSING MECHANISM HAVING SHROUD-NARROWING GAP

CROSS-REFERENCES TO RELATED APPLICATIONS

The instant nonprovisional patent application claims priority to Japanese Patent Application 2006-068723, filed Mar. 14, 2006 and incorporated by reference in its entirety herein for all purposes.

BACKGROUND OF THE INVENTION

In an information recording device such as a magnetic disk drive or an optical disk device that records and reproduces information to and from a disk that rotates, vibration in the disk causes a deviation in position between the head for recording and reproducing information and the track which is a place where information is recorded on the disk, and has, therefore, been desired to be decreased. In recent years, in particular, the positioning maintaining a high precision has been requested along with an increase in the recording density, and it is becoming more important to decrease vibration in the disk caused by the disturbance in the flow of air in the device, which is called disk fluttering, accompanying an increase in the rotational speed of the disk.

A conventional magnetic disk drive has been disclosed in, for example, JP-A-11-232866 (patent document 1). The magnetic disk drive of the patent document 1 includes a rotary magnetic disk, a head for recording or reproducing information into or from the magnetic disk, and a head support mechanism for supporting the head, wherein a shroud is provided surrounding the outer circumference of the magnetic disk except a portion where a carriage arm linked to the head support mechanism is inserted, and a gap between the outer circumferential edge of the magnetic disk and the shroud surface is selected to be not smaller than 0.1 mm but not larger than 0.6 mm. There has been described that the above constitution eliminates a difference in the air pressure occurring on both surfaces (front and back surfaces) of the disk and, as a result, decreases the fluttering.

A conventional disk flutter-suppressing device has been disclosed in, for example, JP-A-2000-331460 (patent document 2). The disk flutter-suppressing device of the patent document 2 includes a disk spindle mechanism having one or a plurality of disks, wherein squeeze air bearing plates having a partial annular flat surface expanding in the circumferential direction and in the radial direction, are fixed onto the uppermost surface, onto the lowermost surface, or onto both disk surfaces, or onto the surfaces on one side of all disks facing the disk surfaces maintaining a gap of not larger than 0.3 mm. There has been described that the above constitution is effective in suppressing the disk fluttering owing to the damping effect of the squeeze air films.

Furthermore, conventional slit shrouds have been disclosed in, for example, JP-A-2000-228079 (patent document 3) and JP-A-2004-234784 (patent document 4).

In the magnetic disk drive of the above patent document 1, however, the outer circumferential edge of the magnetic disk is brought close to the whole shroud surface. At the time of incorporating the magnetic disk, therefore, the outer circumferential edge of the magnetic disk is likely to come into collision with the shroud surface leaving a problem from the standpoint of incorporating the magnetic disk.

In the disk flutter-suppressing device of the above patent document 2, the squeeze air bearing plates are brought close to the recording surface of the magnetic disk and are, therefore, likely to come in contact with the recording surface of the magnetic disk. In case they come in contact, the recording surface is damaged arousing a problem concerning reliability in the recording. In the slit shroud of the above patent documents 3 and 4, a gap between the disk and the slit shroud is uniform and the slit shroud is opened at a side which does not face the disk.

When a portion is specified for suppressing the vibration of the rotary disk, the portion where vibration is to be suppressed may be effectively handled. In information recording units such as a magnetic disk drive and an optical disk drive, it is becoming necessary to accomplish the positioning highly precisely on a track of a high recording density, and it is particularly important to lower the amplitude of vibration at the head position.

BRIEF SUMMARY OF THE INVENTION

Embodiments in accordance with the present invention relate to greatly decreasing vibrations of a rotary disk at a portion where vibration on the disks is to be suppressed in a vibration-suppressing mechanism for rotary disks while enabling the rotary disks to be incorporated in the shroud surface. In the particular embodiment shown in FIGS. 1-2, the vibration-suppressing mechanism for rotary disks comprises at least one rotary disk 1 and a shroud surface 2a extending along and facing the outer circumferential edges of the disk 1. The shroud surface is so formed as to possess a portion where a gap between the outer circumferential edge of the disk 1 and the shroud surface 2a becomes small near a portion 4 where the vibration of the disk 1 is to be suppressed.

For a more complete understanding of the present invention, reference is made to the following detailed description taken in conjunction with the accompanying drawings.

DETAILED DESCRIPTION OF THE INVENTION

Figure 1:
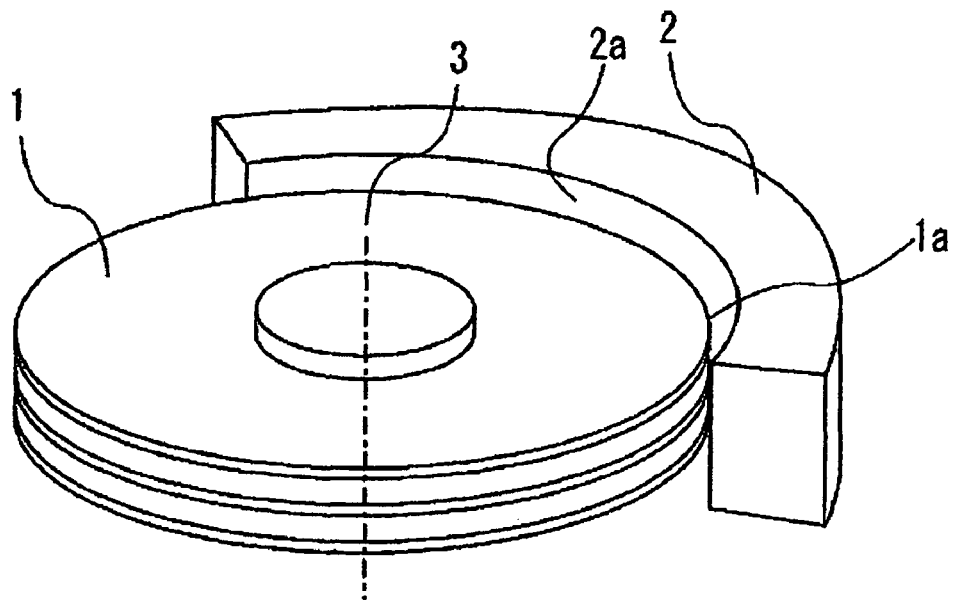
FIG. 1 is an exemplary perspective view of a vibration-suppressing mechanism for rotary disks according to a first embodiment of the present invention.

Embodiments in accordance with the present invention relate to a vibration-suppressing mechanism for rotary disk, information recording device and magnetic disk drive.

Embodiments of the present invention provide a vibration-suppressing mechanism for rotary disks, which is capable of greatly decreasing vibration at a portion where vibration on the disk is to be suppressed while enabling the rotary disk to be incorporated in the shroud surface.

Embodiments of the present invention also provide an information recording device and a magnetic disk drive which are capable of greatly decreasing vibration in the disk at the head position while enabling the disk to be incorporated in the shroud surface maintaining reliability in the recording of disk.

A first embodiment of the present invention comprises one or a plurality of rotary disks and a shroud surface extending along and facing the outer circumferential edges of the disks, wherein the shroud surface is so formed as to possess a portion where a gap between the outer circumferential edges of the disks and the shroud surface becomes small near a portion where the vibration of the disk is to be suppressed.

Described below are more configurations of the first embodiment of the invention.

(1) The shroud surface is positioned at a portion where the gap is the smallest between the shroud surface and the outer circumferential edges of the disks on a line that connects the axis of rotation of the disks to a portion where the vibration is to be suppressed, the shroud surface being so formed that the gap gradually increases as it goes away from the above portion.

(2) The shroud surface is so formed that portions thereof where the gap is increasing are symmetrical along the rotational direction of the disk starting from a portion where the gap is the smallest between the outer circumferential edge of the disk and the shroud surface.

(3) The shroud surface of a portion where the gap becomes the smallest between the outer circumferential edges of the disks and the shroud surface is formed in an arc of a radius of curvature greater than the arc of the shroud surface of any other portion.

(4) When a minimum gap between the disk and the shroud is denoted by d and the radius of the disk by r, the shroud surface is so formed that the ratio d/r is in a range of not larger than 0.002 but is not smaller than 0.0005.

(5) The portion where the shroud surface becomes narrow has an angle of not smaller than 90 degrees as measured with the axis of rotation as a center, and is so located as to include a line that connects the axis of rotation of the disks to the portion where the vibration is to be suppressed.

A second embodiment of the present invention is concerned to an information recording device having a spindle motor, a disk rotated by the spindle motor, a head for recording or reproducing information into or from the disk, and a shroud surface extending along and facing the outer circumferential edge of the disk, wherein the shroud surface is so formed as to possess a portion where a gap between the outer circumferential edge of the disk and the shroud surface becomes small near the head which is a portion where the vibration of the disk is to be suppressed.

Described below are more configurations of the second embodiment of the present invention.

(1) The shroud surface of a portion where the gap becomes small between the outer circumferential edge of the disk and the shroud surface is formed in an arc of a radius of curvature greater than the arc of the shroud surface of any other portion.

(2) When a minimum gap between the outer circumferential edge of the disk and the shroud is denoted by d and the radius of the disk by r, the shroud surface is so formed that the ratio d/r is in a range of not larger than 0.002 but is not smaller than 0.0005.

(3) The should is installed so as to move at a portion where a small gap is formed by the shroud surface near the head, the shroud forming the shroud surface facing the outer circumferential edge of the disk, and provision is made of a moving mechanism which holds the movable shroud close to the disk when the disk is rotating, and holds the movable shroud away from the disk when the disk is halting.

(4) In (3) above, the movable should is supported at an end on one side thereof so as to rotate, a magnetic member is installed on the movable shroud at an end on the other side thereof, and a solenoid coil is installed so as to adsorb and release the magnetic member.

A third embodiment of the present invention is concerned with a magnetic disk drive comprising a spindle motor, a magnetic disk rotated by the spindle motor, a magnetic head that moves on the magnetic disk in a radial direction to record or reproduce information into or from the magnetic disk, a shroud surface extending along and facing the outer circumferential edge of the magnetic disk, and an enclosure for containing the magnetic disk, the magnetic head and the shroud surface, wherein the shroud surface is so formed as to possess a portion where a gap between the outer circumferential edge of the disk and the shroud surface becomes small near the magnetic head which is a portion where the vibration of the magnetic disk is to be suppressed.

Further, a fourth embodiment of the invention is concerned to a magnetic disk drive comprising a spindle motor, a magnetic disk rotated by the spindle motor, a magnetic head that moves on the magnetic disk in a radial direction to record or reproduce information into or from the magnetic disk, a shroud surface extending along and facing the outer circumferential edge of the magnetic disk, and an enclosure for containing the magnetic disk, the magnetic head and the shroud surface, wherein the shroud surface is formed being partly brought close to the outer circumferential edge of the magnetic disk, so that the amplitude of the magnetic disk near the magnetic head is smaller than an average amplitude of the magnetic disk and that the amplitude at a position symmetrical to near the magnetic head with respect to the axis of rotation of the spindle motor is greater than the average amplitude of the magnetic disk.

According to the vibration-suppressing mechanism for rotary disks of the present invention, it is made possible to greatly decrease vibration at a portion where vibration on the disk is to be suppressed while enabling the rotary disk to be incorporated in the shroud surface.

According to the information recording device and the magnetic disk drive of the present invention, further, it is made possible to greatly decrease vibration in the disk at the head position while enabling the disk to be incorporated in the shroud surface and maintaining reliability in the recording of disk.

Hereinafter, a plurality of embodiments of the present invention will now be described with reference to the drawings.

The vibration-suppressing mechanism for rotary disks according to the first embodiment of the invention will now be described with reference to FIGS. 1 to 7.

Figure 2:
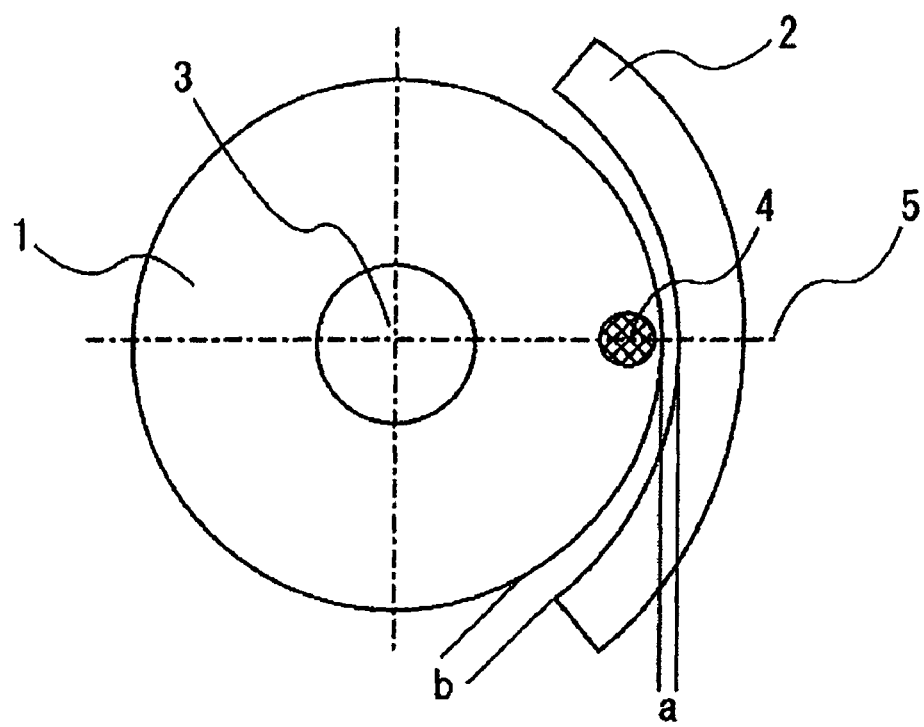
FIG. 2 is an exemplary plan view of the vibration-suppressing mechanism for rotary disks of FIG. 1.

The vibration-suppressing mechanism for rotary disks according to the embodiment will now be described with reference to FIGS. 1 and 2. FIG. 1 is a perspective view of the vibration-suppressing mechanism for rotary disks of this embodiment, and FIG. 2 is a plan view of the vibration-suppressing mechanism for rotary disks of FIG. 1.

The vibration-suppressing mechanism for the rotary disks is constituted by a plurality of disks 1 that rotate, and a shroud surface 2a extending along and facing the outer circumferential edges 1a of the disks 1. The plurality of disks 1 rotate about a common axis 3 of rotation as a center axis. The invention can be applied even when there is only one piece of rotary disk 1. The shroud surface 2a is constituted by the inner circumferential surface of the shroud 2. The shroud 2 is partly arranged along the circumferential direction of the outer circumferential edges 1a of the disks 1.

The shroud surface 2a is so formed as to possess a portion where a gap between the outer circumferential edges 1a of the disks 1 and the shroud surface 2a becomes narrow near a portion 4 where the vibration of the disks 1 is to be suppressed. In this embodiment, the whole shroud surface 2a formed by the shroud 2 constitutes a portion that becomes narrow.

The gap between the outer circumferential edges 1a of the disks 1 and the shroud surface 2a is not uniform along the outer circumferential edges 1a of the disks 1, the gap a being the smallest at the central portion of the shroud 2, and the gap b being the greatest at the ends. That is, the shroud surface 2a is so formed as to possess a portion where the gap between the outer circumferential edges 1a of the disks 1 and the shroud surface 2a becomes the smallest near the portion 4 where the vibration of the disks 1 is to be suppressed. In other words, the shroud surface 2a is formed being partly brought close to the outer circumferential edges 1a of the disks 1, so that the amplitude near the portion 4 where the vibration is to be suppressed is smaller than an average amplitude of the disk and that the amplitude at a position symmetrical to the portion 4 where the vibration is to be suppressed with respect to the axis of rotation of the disks 1 is larger than the average amplitude of the disks 1.

The portion 4 where the vibration of the disks 1 is to be suppressed is the mesh portion 4 in FIG. 2 where it is desired to suppress the vibration. In this embodiment, the central portion of the shroud 2 is positioned on an extension 5 of a line that connects the axis 3 of rotation to the portion 4 where the vibration is to be decreased.

Next, described below with reference to FIGS. 3 to 7 is the effect of the gap that is non-uniformly distributed as described above upon the specific vibration mode of the disks 1.

Figure 3:
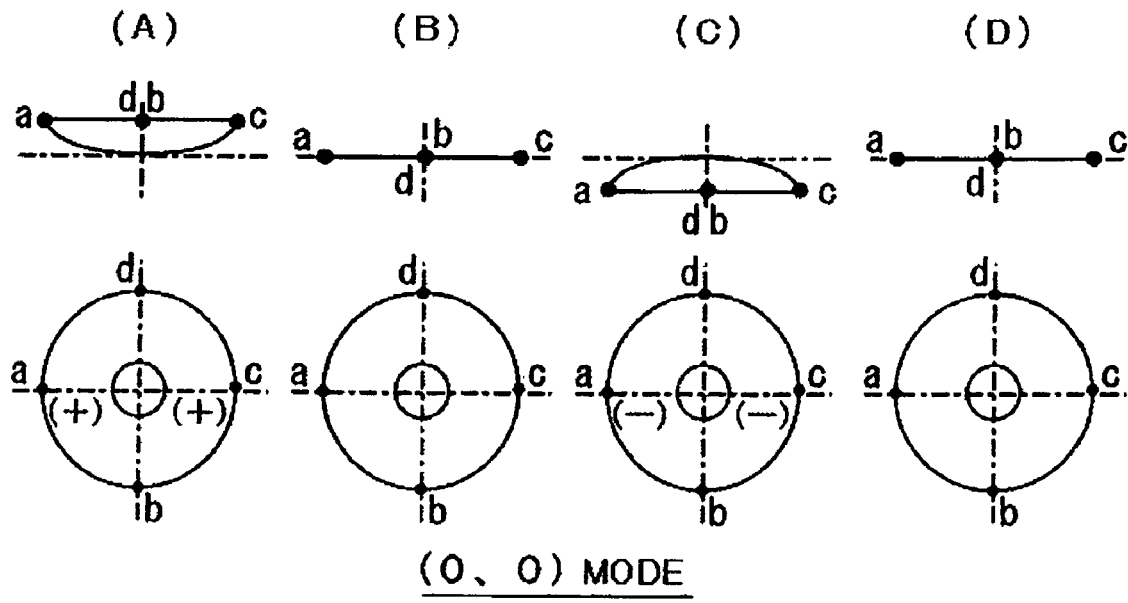
FIG. 3 is an exemplary diagram schematically illustrating specific vibration modes of an ordinary disk.
Figure 3:
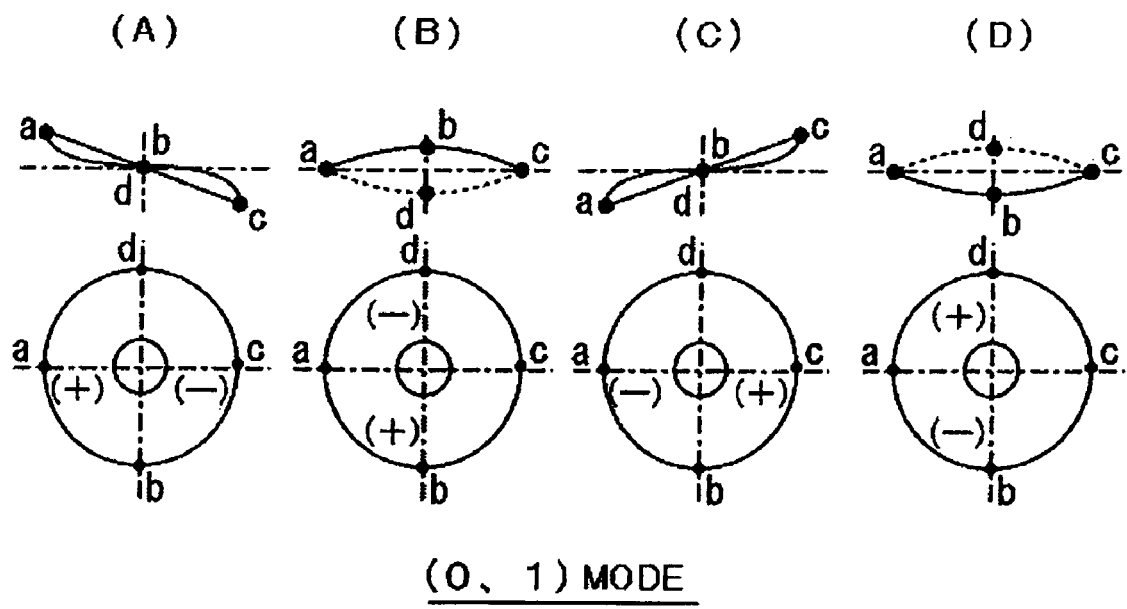

First, described below is the vibration mode of the disks 1 that rotates. FIG. 3 schematically illustrates a mode (0, 0) and a mode (0, 1) among the specific vibration modes of an ordinary disk. These modes are principal ones among the disk flattering vibrations of, for example, a magnetic disk device.

The upper stage of the drawing illustrates a mode of change when the disk 1 is viewed sideways, and the lower stage of the drawing illustrates a mode of when the disk 1 is viewed from the upper surface. Here, (+) and (−) represent displacements upward and downward, respectively. The points a, b, c and d along the outer circumference of the disk 1 are the same between the upper stage and the lower stage. Each mode includes four drawings (A), (B), (C) and (D) in the transverse direction, representing changes in different phases. In the mode (0, 0), changes take place in order of (A)→(B)→(C)→(D) with the passage of time while the mode (0, 1) includes a front-turn mode and a back-turn mode. If now the disk 1 rotates in the counterclockwise direction, i.e., in order of a→b→c→d, changes take place in order of (A)→(B)→(C)→(D) in the front-turn mode and in order of (A)→(D)→(C)→(B) in the back-turn mode.

The specific vibration mode of the disk 1 varies for the reasons as described below. The occurrence of aerodynamic damping force in the gap between the disks 1 and the shroud surface 2a has been disclosed in the Theoretical Consideration, 2006-1 (technical document 1) which is concerned with the aerodynamic damping of fluttering in the gap between the disk and the shroud, Proceedings of the Japanese Mechanical Association (Edition C), Vol. 72, No. 713. Though the damping force varies depending upon the gap, the technical document 1 presumes that the gap is constant. If expressed by a mode coordinate system, the equation of motion of the disk flattering inclusive of the aerodynamic damping effect is given by the following formula (1). Here, Ca that represents the aerodynamic damping force becomes a diagonal matrix when the gap between the disk 1 and the shroud surface 2a is constant. When the gap between the disk 1 and the shroud surface 2a is not constant as in this embodiment, however, the asymmetrical term of Ca does not become 0, and the modes often become continuous.

[Formula 1]

$$M\ddot{q}+(C+Ca)\dot{q}+(K+Ka)q=f \qquad (1)$$

Figure 4:
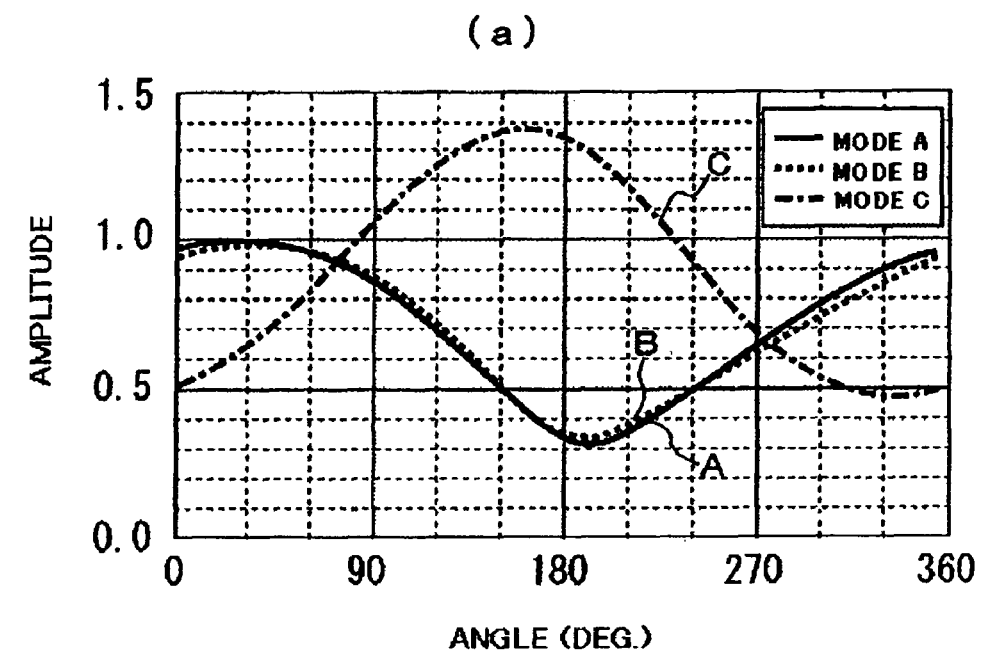
FIG. 4 is an exemplary diagram illustrating the calculated results of the controlled specific vibration modes of the disks that are shown in FIG. 1.
Figure 4:
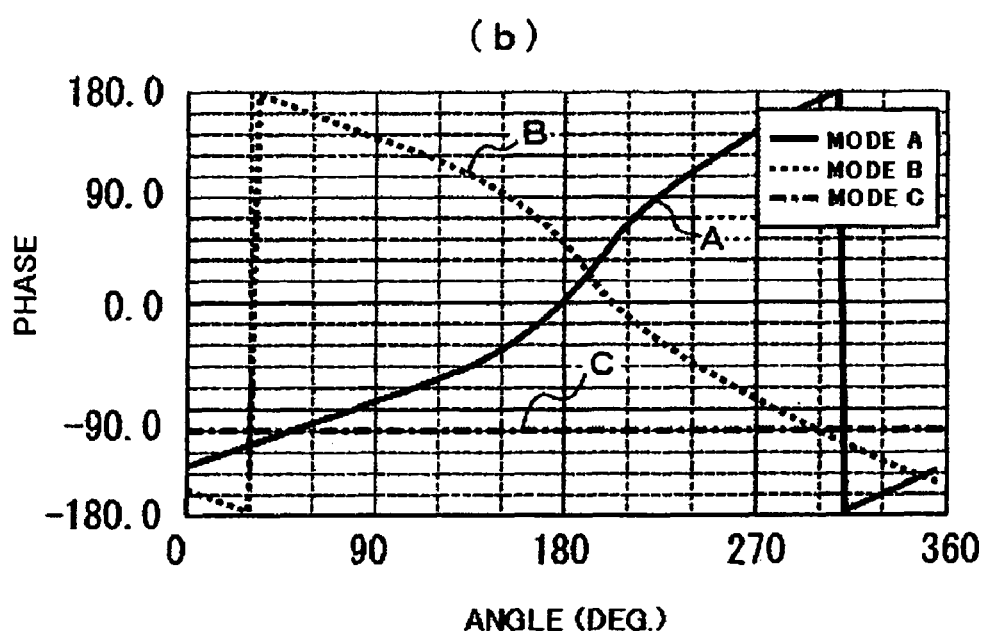

FIG. 4 illustrates specific vibration modes obtained by analyzing the formula (1) for its specific values. In the upper graph of FIG. 4, the abscissa represents the position (angle) in the circumferential direction and the ordinate represents the amplitude. In the lower graph of FIG. 4, the abscissa, similarly, represents the position (angle) in the circumferential direction while the ordinate represents the phase. According to this analytical calculation, the shroud 2 faces the disks 1 from a position of 90 degrees up to a position of 270 degrees, and the gap between the disks 1 and the shroud surface 2a becomes the smallest at the central position of 180 degrees. Further, the rotational direction of the disks 1 is a positive direction of the abscissa, i.e., is a direction from the left toward the right.

The upper graph of amplitudes of FIG. 4 tells that the amplitude is not constant along the circumferential direction. In the mode A and mode B shown in the graph, the amplitudes become the smallest near 180 degrees. In the mode C, on the other hand, the amplitude becomes the greatest near 180 degrees. The amplitudes shown here are so normalized that the maximum value is 1 and are not, therefore, the real amplitudes. In practice, it has been known that the mode damping ratio in the mode C is as very great as several tens of percent, and the amplitude is not almost of a problem. That is, vibration of the disks becomes the smallest at the 180-degree position, i.e., at central portion of the shroud where the amplitude becomes the smallest in the mode A and in the mode B.

Referring to the lower graph of phase in FIG. 4, the phase advances in the mode A with an increase in the rotational angle. In the mode B, on the other hand, the phase is delayed. This shows that the mode A is the back-turn mode and the mode B is the front-turn mode.

Figure 5:
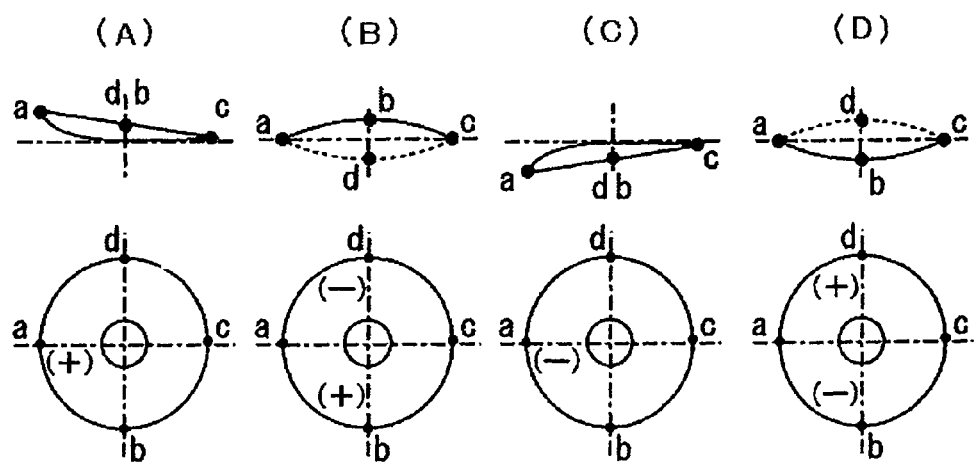
FIG. 5 is an exemplary diagram schematically illustrating the controlled specific vibration modes of the disks that are shown in FIG. 1.

FIG. 5 is a schematic diagram of mode shapes of the mode A and the mode B, wherein the signs are the same as those of FIG. 3. In the mode A, however, the deformation proceeds in order of (A)→(D)→(C)→(B), and in the mode B, the deformation proceeds in order of (A)→(B)→(C)→(D).

Figure 6:
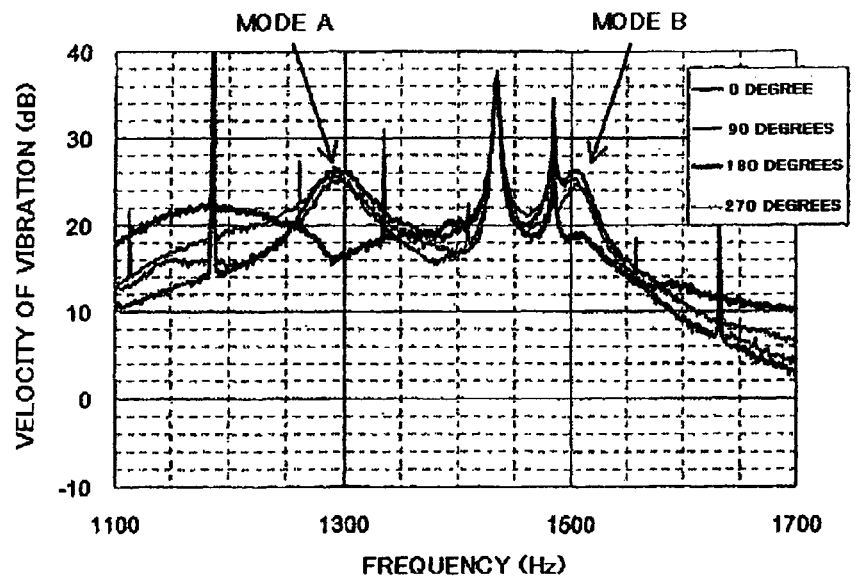
FIG. 6 is an exemplary diagram of frequency spectra of vibration of the disks that are measured.

FIG. 6 shows the frequency spectra of vibration of the disks 1 measured by experiment. In this experiment, too, the shroud 2 is facing from a position of 90 degrees through up to a position of 270 degrees, and the gap between the disks 1 and the shroud surface 2a is the smallest at the center of the shroud 2, i.e., at a position of 180 degrees. In the graph of FIG. 6, the abscissa represents the frequency and the ordinate represents the velocity of vibration of the disks 2.

From the peaks in the mode A and the mode B in the graph, it will be learned that the vibration is decreased down to a level from which the peaks are not almost recognized at the 180-degree position. The aerodynamic damping force due to the gap between the disks 1 and the shroud surface 2a, that varies the vibration mode, increases as the gap decreases and, according to the technical document 1, varies in proportion to the minus third power of the ratio of the gap d and the radius r of the disks, i.e., of the ratio d/r. Through experiment, it was learned that the effect for varying the vibration mode becomes conspicuous when d/r is not larger than 0.002. Due to variation in fabricating the device, however, it is difficult to suppress d/r to be 0, and it is considered that a value of about 0.0005 is a practical lower limit.

The effect for varying the vibration mode is further dependent upon the angle at which the shroud surface 2a is facing the disks 1. When the angle at which the shroud surface 2a faces the disks 1 becomes too small, the effect decreases, the amplitude of vibration becomes the same at any position on the circumference, and the effect contemplated by the invention is not obtained.

Figure 7:
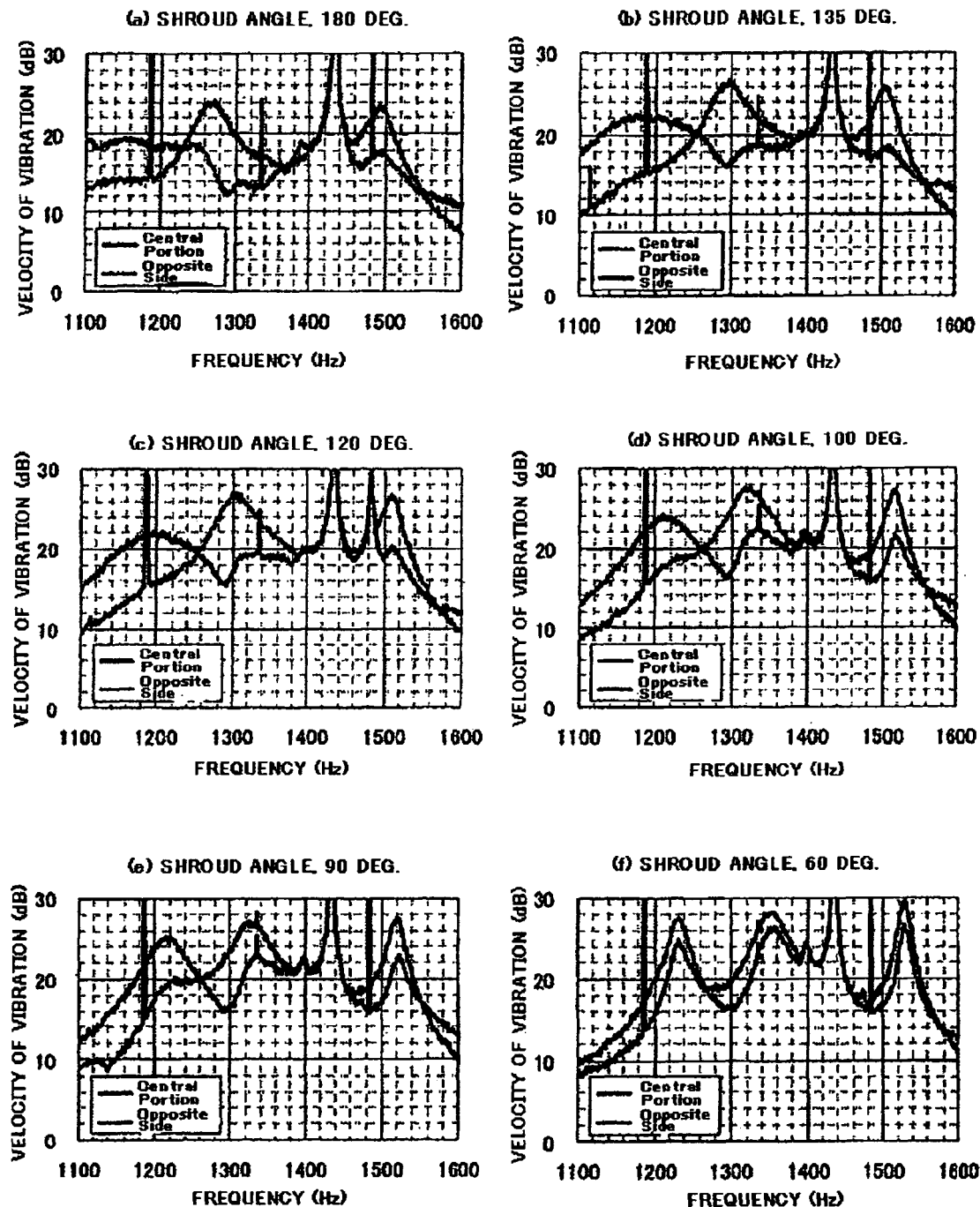
FIG. 7 is a graph illustrating the exemplary results of experiment while varying the shroud angle.

FIG. 7 illustrates the results of experiment obtained by varying the angle (shroud angle) at which the shroud 2 faces the disks 1 from 180 degrees to 60 degrees. Frequency spectra of vibration of the disks are compared being measured at a central point (central portion) of the shroud and at a point (opposite side portion) on the side opposite thereto with respect to the axis of rotation in each of the cases. When the shroud angle is not smaller than 90 degrees, the amplitude at the central point of the shroud becomes obviously smaller than the amplitude at the point on the opposite side at two peaks near 1350 Hz and 1550 Hz. When the shroud angle is 60 degrees, on the other hand, there is almost no difference between them. It, therefore, becomes obvious that the angle at which the shroud 2 faces the disks 1 must not be smaller than 90 degrees.

This embodiment includes the rotary disks 1 and the shroud surface 2a which extends along and facing the outer circumferential edges 1a of the disks 1, the shroud surface 2a being so formed as to possess a portion where the gap between the outer circumferential edges 1a of the disks 1 and the shroud surface 2a becomes small near the portion 4 where the vibration of the disks 1 is to be suppressed. According to this constitution, the disks 1 can be favorably incorporated relative to the shroud surface 2a as compared to when the gap between the outer circumferential edges 1a of the disks 1 and the shroud surface 2a is narrow over the whole outer circumferential edges 1a of the disks 1. According to this constitution, further, the vibration can be greatly decreased at the portion 4 where the vibration of the disks is to be suppressed due to an increase in the vibration on the side opposite to the portion where the vibration of the disks is to be suppressed.

Figure 8:
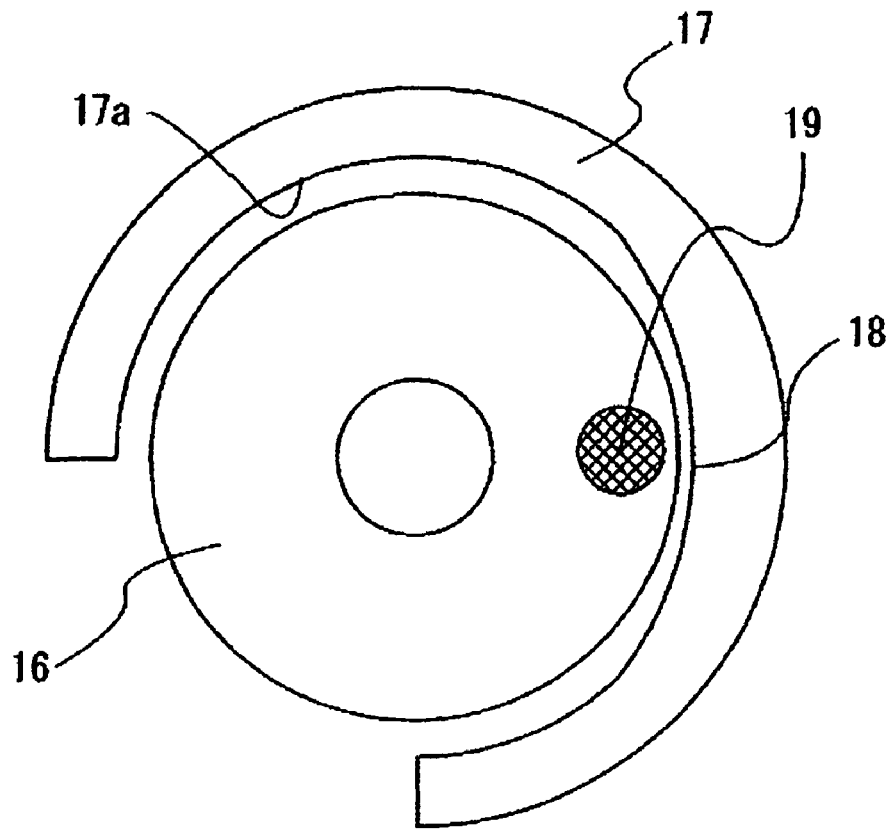
FIG. 8 is an exemplary plan view of the vibration-suppressing mechanism for rotary disks according to a second embodiment of the present invention.

Next, a second embodiment of the invention will be described with reference to FIG. 8. FIG. 8 is a plan view of the vibration-suppressing mechanism for rotary disks according to the second embodiment of the invention. The second embodiment is different from the first embodiment with respect to points described below. Concerning the other points, the second embodiment is basically the same as the first embodiment, and the overlapping description is not repeated.

The second embodiment includes rotary disks 16 and a shroud surface 17a which surrounds them, wherein part of the shroud surface 17a of the shroud 17 facing the disks 16 constitutes a narrow shroud portion 18 in a curved shape having a radius of curvature larger than that of other portions. The gap between the disks 16 and the narrow shroud portion 18 is the smallest at the central portion of the narrow shroud portion 18, and a portion 19 where the vibration of the disks is to be suppressed is located near the above portion. The second embodiment, too, exhibits the same effect as that of the first embodiment.

Next, third to fifth embodiments of the invention will be described with reference to FIGS. 9 to 12. FIGS. 9 to 12 are plan views of the magnetic disk drive according to the third to fifth embodiments of the invention. The third to fifth embodiments are different from the first embodiment with respect to that the invention is applied to the magnetic disk drive which is an information recording device, and the embodiments are different from each other concerning the points described below. In the third to fifth embodiments, the disks 1 used in the first embodiment are replaced by disks or magnetic disks.

Figure 9:
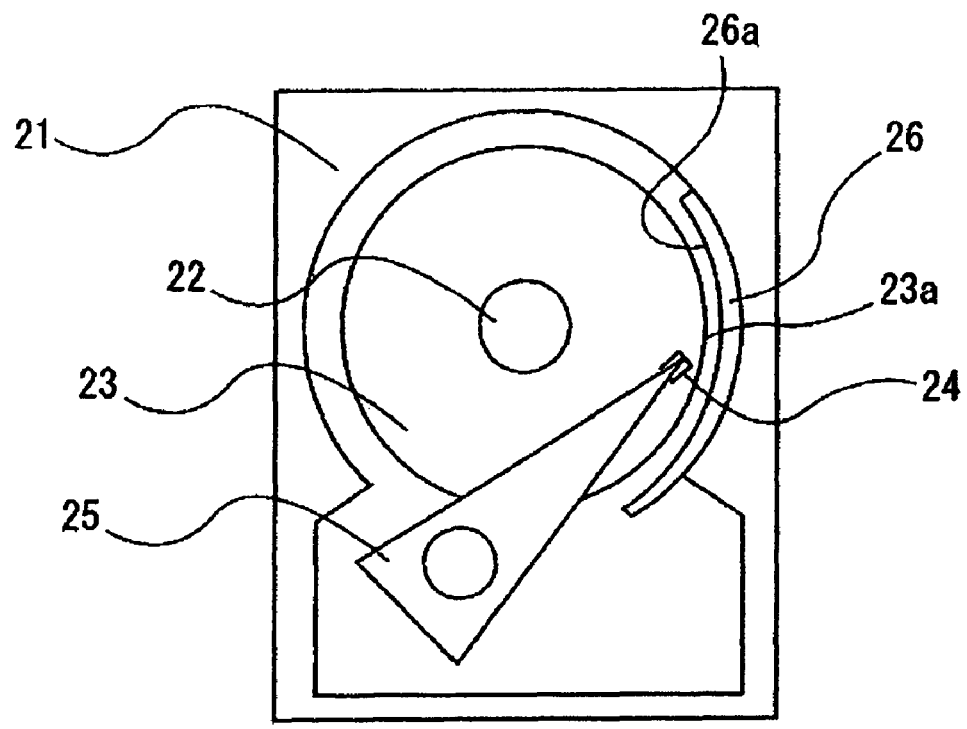
FIG. 9 is an exemplary plan view of a magnetic disk drive according to a third embodiment of the present invention.

The magnetic disk drive of the third embodiment shown in FIG. 9 includes an enclosure comprising a base 21 and a cover, a spindle motor 22 mounted on the base 21, magnetic disks 23 that rotate being fixed to the spindle motor 22, an actuator 25 mounted on the base 21, a magnetic head 24 attached to an end of the actuator 25 and moves on the magnetic disk 23 in the radial direction thereof to record or reproduce information to and from the magnetic disk 23, and a narrow shroud 26 having a shroud surface 26a extending along and facing the outer circumferential edges 23a of the magnetic disks 23.

The enclosure contains the magnetic disks 23, magnetic head 24 and narrow shroud 26. The narrow shroud 26 is installed near the magnetic head 24 which is a portion where vibration is to be suppressed. The gap between the magnetic disks 23 and the narrow shroud 26 is the smallest at the center of the narrow shroud 26 and is broadened toward both ends thereof. In other words, the shroud surface 26a is formed being partly brought close to the outer circumferential edges 23a of the magnetic disks 23, so that the amplitude of the magnetic disks 23 near the magnetic head is smaller than an average vibration of the magnetic disks 23 and that the amplitude at a position symmetrical to near the magnetic head with respect to the axis of rotation of the spindle motor 22 is greater than the average amplitude of the magnetic disks 23.

The constitution of the third embodiment makes it possible to so control the vibration mode of the magnetic disks 23 that the amplitude becomes the smallest near the magnetic head 24, and the positioning error due to disk fluttering can be greatly decreased.

Figure 10:
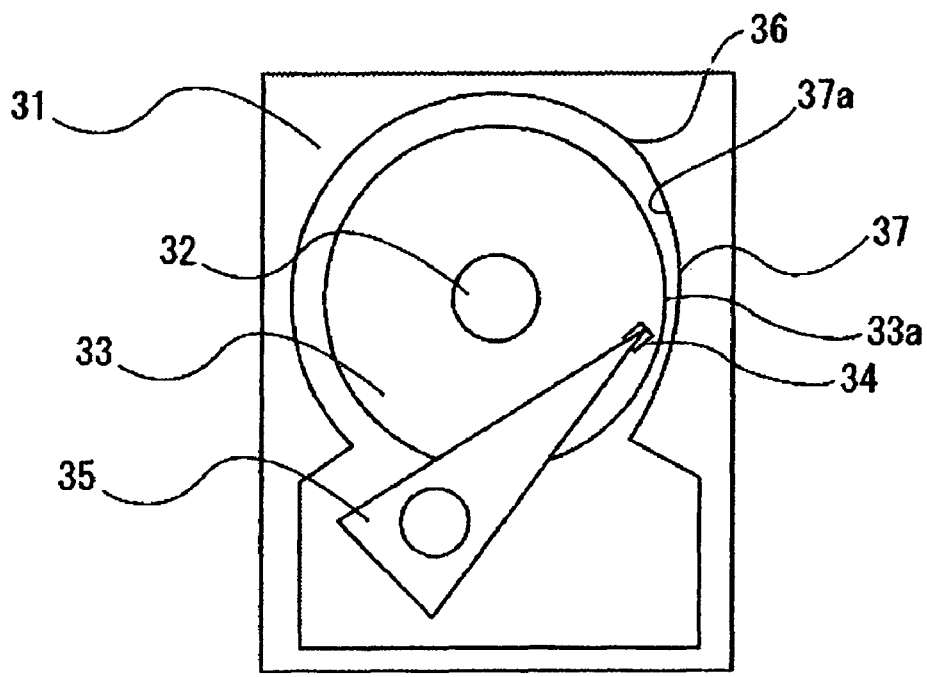
FIG. 10 is an exemplary plan view of the magnetic disk drive according to a fourth embodiment of the present invention.

In the fourth embodiment shown in FIG. 10, magnetic disks 33 are fixed to a spindle motor 32 mounted on a base 31, and an actuator 35 having a magnetic head 34 at an end thereof is mounted on the base 31. A narrow shroud 37 having a curve of a curvature smaller than the shroud 36 is provided near the magnetic head 34, and the gap between the circumferential edge 33a of the magnetic disks 33 and the shroud surface 37a of the narrow shroud 37 is the smallest at the center of the narrow shroud 37 and is broadened toward both ends thereof. Therefore, the vibration mode of the magnetic disks 33 is so controlled that the amplitude becomes the smallest near the magnetic head 34, and the positioning error due to disk fluttering is greatly decreased, enabling the narrow shroud 37 to be easily formed.

Figure 11:
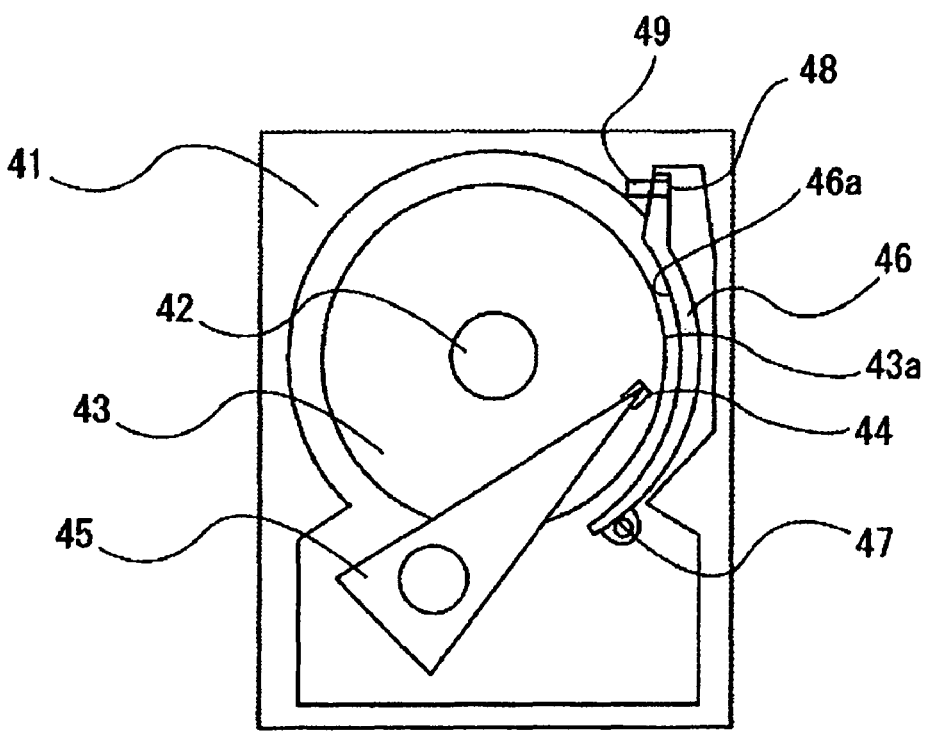
FIG. 11 is an exemplary plan view of when the disk is driven in the magnetic disk drive according to a fifth embodiment of the present invention.
Figure 12:
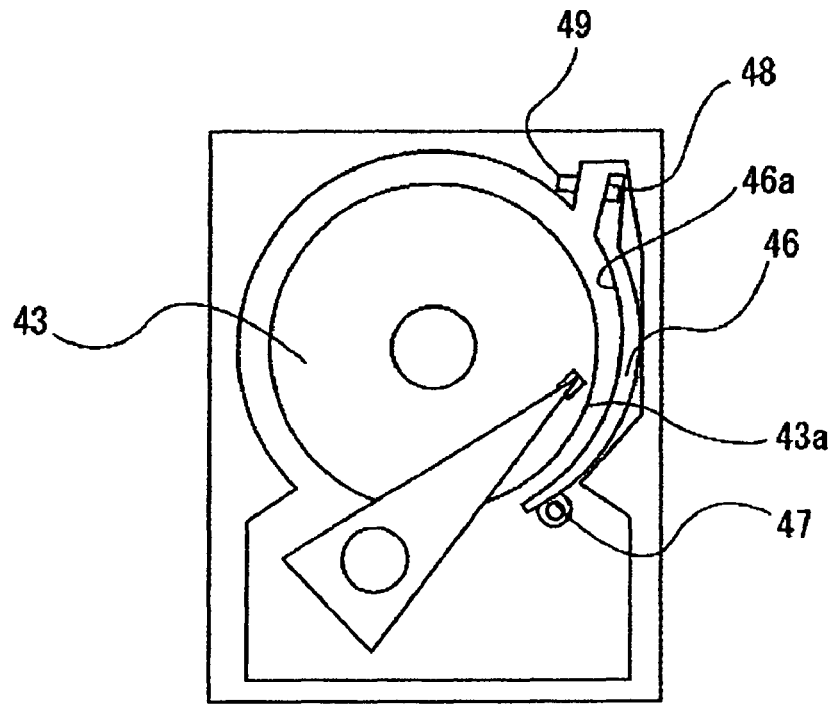
FIG. 12 is an exemplary plan view of when the disk is not being driven in the magnetic disk drive of FIG. 1.

In the fifth embodiment shown in FIGS. 11 and 12, magnetic disks 43 are fixed to a spindle motor 42 mounted on a base 41, and an actuator 45 having a magnetic head 44 at an end thereof is mounted on the base 41. A movable shroud 46 is provided near the magnetic head 44. The movable shroud 46 is supported to rotate at a support portion 47 provided at an end thereof. A magnetic material 48 is buried in the other end thereof, and is adsorbed/released by a solenoid coil 49 provided on the base 41.

In the fifth embodiment, the gap between the circumferential edge 43a of the rotary magnetic disks 43 and the shroud surface 46a of the movable shroud 46 can be set to be very narrow as shown in FIG. 11. When the magnetic disk drive is not in operation such as during the transit, it is a requirement that the magnetic disk drive withstands a large shock from the external side. In such a case, the magnetic disks 43 may collide with the movable shroud 46 due to the deformation of the spindle motor 42 which, in the worst case, may result in a fault. To avoid this, when not in operation, no current is supplied to the solenoid coil 49 and the magnetic material 48 is released permitting the movable shroud 46 to separate away from the magnetic disk 43 as shown in FIG. 12. Therefore, despite a shock is imparted from the external side, a strong shock that may cause a fault is prevented.

Next, described below is how to measure the disk fluttering in the magnetic disk drive with reference to FIGS. 13 and 14.

Figure 13:
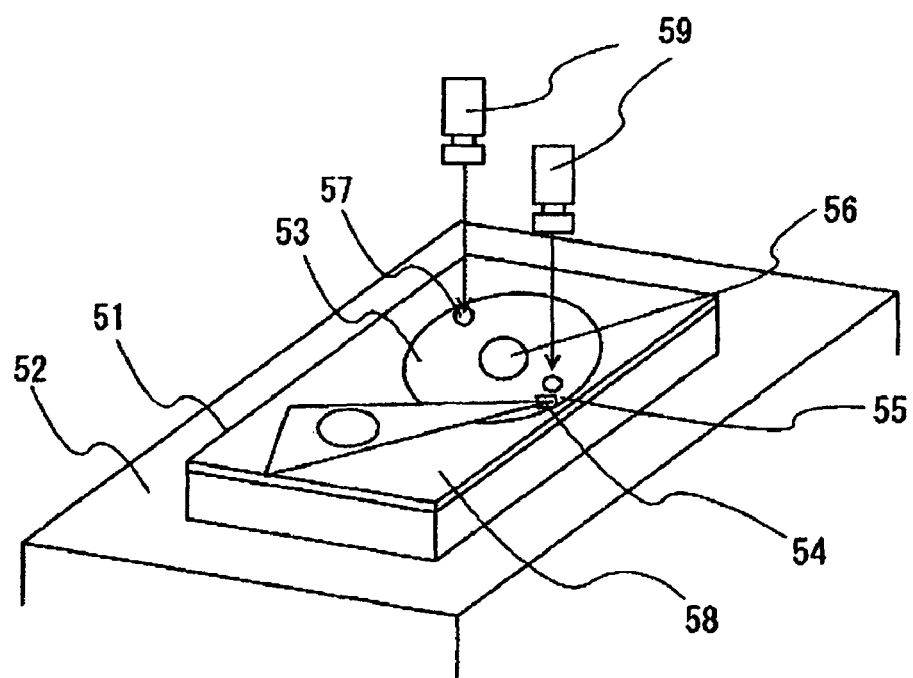
FIG. 13 is an exemplary view illustrating a method of measuring the disk fluttering of the magnetic disk.

FIG. 13 is a diagram illustrating a method of measuring the disk fluttering in the magnetic disk drive. According to this measuring method, a magnetic disk drive 51 is fixed on a stool 52, an enclosure 58 is perforated at a point just over a point 55 on a disk 53 close to the magnetic head 54 and at a point just over a point 57 symmetrical to the point 55 with respect to the spindle motor 56, and vibration of the disk 53 is measured through the above holes by using a laser Doppler vibrometer 59.

Figure 14:
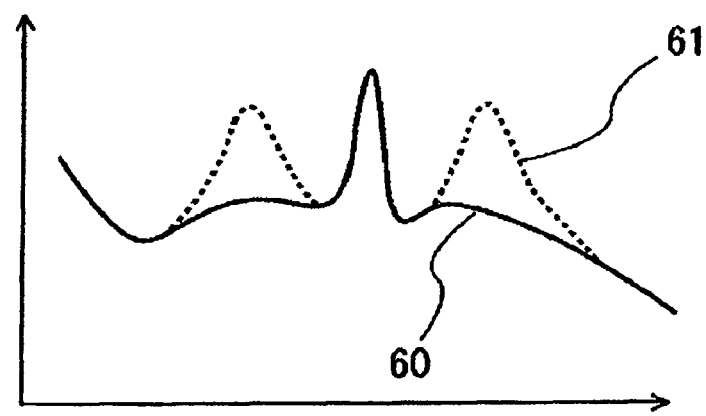
FIG. 14 is an exemplary diagram schematically illustrating frequency spectra measured in FIG. 13.

FIG. 14 is a diagram schematically illustrating frequency spectra measured in FIG. 13. When the invention is applied to the magnetic disk drive, the vibration mode of the disks 51 is controlled. Therefore, a frequency spectrum 60 of disk fluttering measured at the point 55 near the head is quite different from a frequency spectrum 61 measured at the symmetrical point 57, from which it is confirmed that amplitudes of peaks are greatly decreasing in the frequency spectrum 60 measured at the point 55 near the head.

Figure 15:
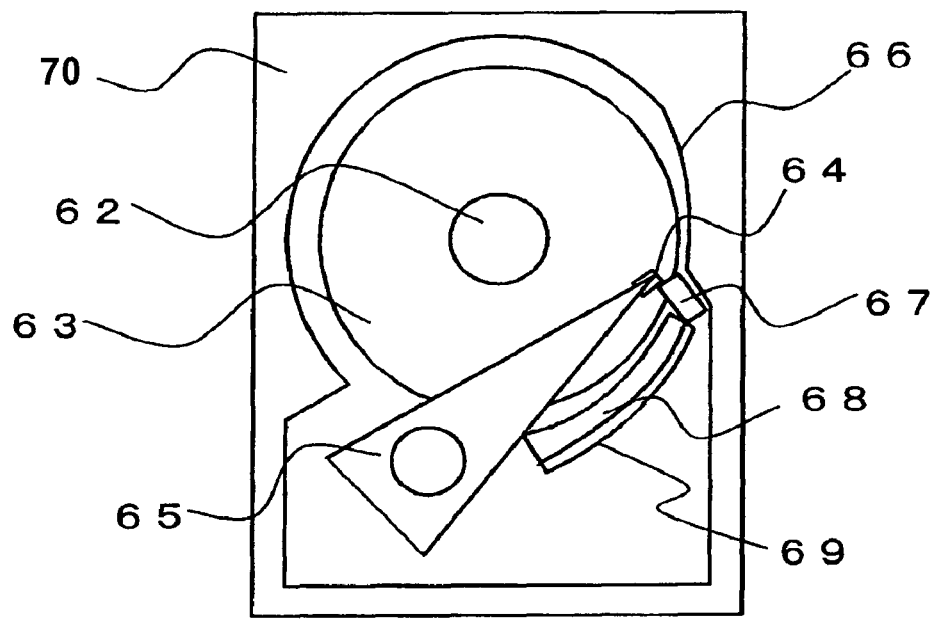
FIG. 15 is an exemplary plan view when applied to an outer circumferential loading/unloading mechanism.
Figure 16:
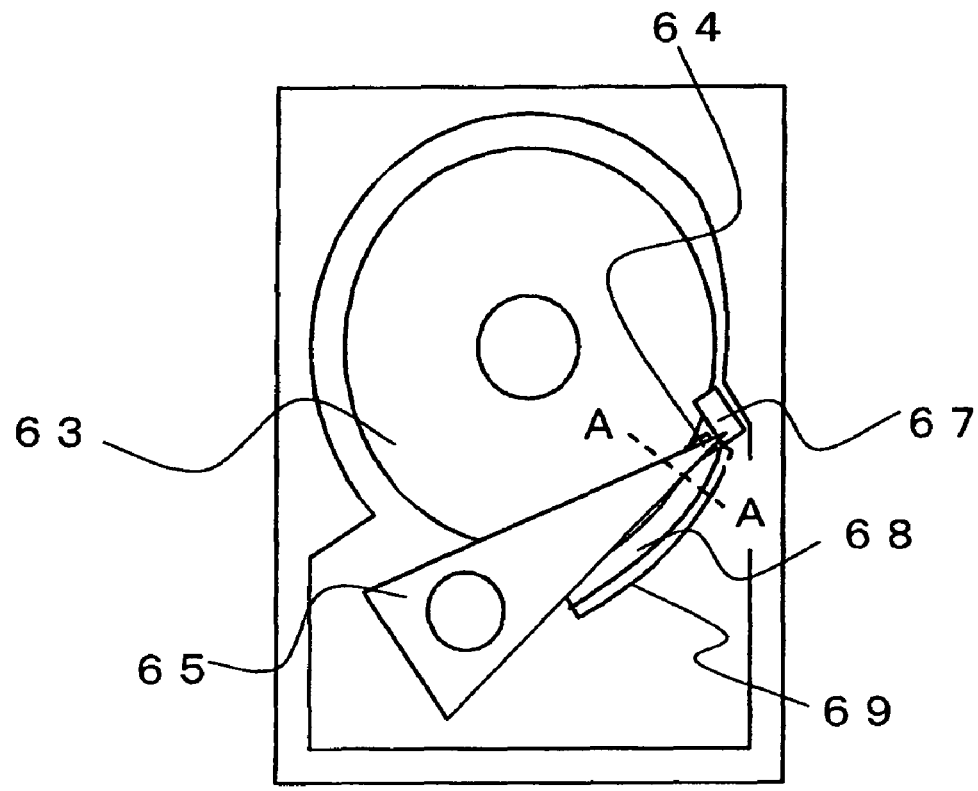
FIG. 16 is an exemplary plan view showing a state that a magnetic head is evacuated to a ramp.
Figure 17:
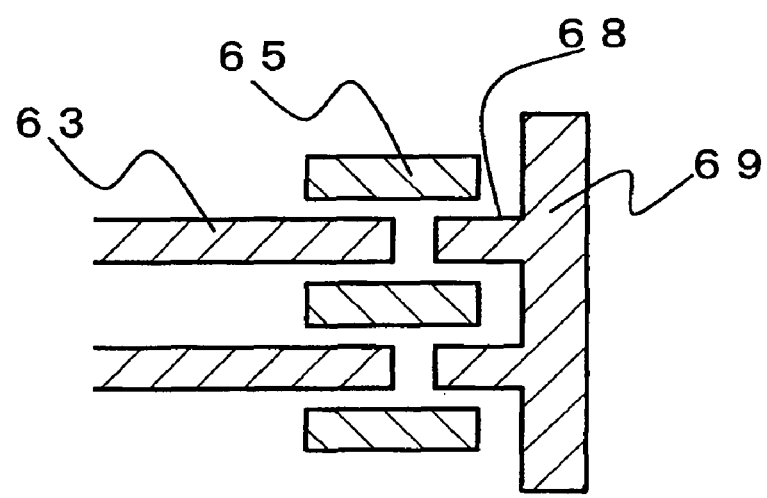
FIG. 17 is a cross-sectional view taken along A-A line of FIG. 16.

In FIGS. 15 to 17, embodiments of the present invention are applied to the magnetic disk drive employing an outer circumferential loading/unloading mechanism in which the magnetic head is evacuated to outside of the disk when the magnetic disk drive is not operated.

In the magnetic disk drive of the embodiment shown in FIG. 15, a magnetic disk 63 is fixed to a spindle motor 62 mounted to a base 70, and an actuator 65 having a magnetic head 64 at a tip end thereof is mounted to the base 70. A ramp 67 for evacuating the magnetic head 64 is provided so as to be partially overlapped with an outer circumferential edge of the disk.

A narrow shroud portion 66 has a gap which is narrow at a vicinity of the ramp 67 and becomes wider as going away from the vicinity of the ramp 67 with respect to the disk 63. In this embodiment, a slit shroud 68 is provided at a side opposite to the narrow shroud portion 66 with respect to the ramp 67. A gap between the slit shroud 68 and the disk 63 is most narrow at a vicinity of the magnetic head 64 or the ramp 67 and becomes wider as going away therefrom. The slit shroud 68 has a vertical wall 69 at an end thereof which does not face the disk.

FIG. 16 shows a state that the magnetic head 64 is evacuated to the ramp 67 in this embodiment of the magnetic disk drive. The actuator 65 is removed from on the disk 63 and laid on the slit shroud 68.

FIG. 17 shows a cross-section taken along line A-A at that time. The slit shroud 68 faces the outer circumferential edge of the disk 63 and has the vertical wall 69 at a side thereof which does not face the disk 63. The actuator 65 is evacuated to a position where it is covered by the slit shroud 68. In a constitution of this embodiment, it is important that the gap between the slit shroud and the disk varies properly and the slit shroud is closed at a side thereof which does not face the disk by the vertical wall.

Figure 18:
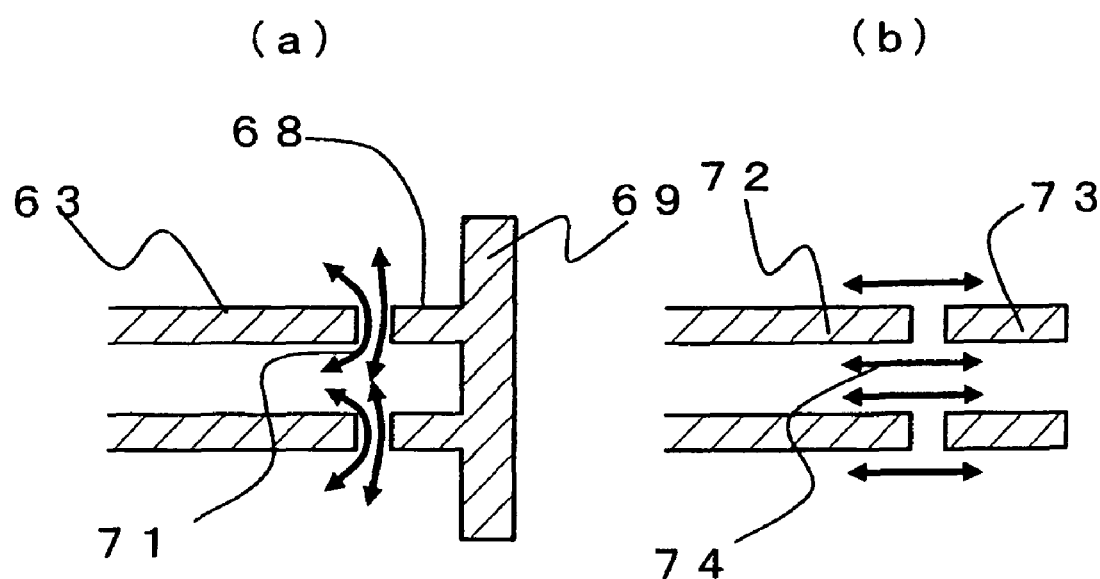
FIG. 18 is a cross-sectional view comparing presence or absence of a vertical wall in a slit shroud.

An effect of presence or absence of the vertical wall is explained with reference to FIG. 18. In a conventional slit shroud, vertical stream flowing through the gap between the disk and the shroud accompanied by vibration of the disk generates an aerodynamic damping force. In the present embodiment with the vertical wall 69 shown in FIG. 18(*a*), since the slit shroud 68 is closed at a side thereof which does not face the disk, the vertical stream 71 is generated in response to vibration of the disk 63, and, in contrast, in a case shown in FIG. 18(*b*) where the slit shroud 73 is opened at a side thereof which does not face the disk 72 as in the conventional slit shroud, in-plane stream 74 is generated in response to vibration of the disk 72. In case of the conventional slit shroud, an aerodynamic damping force is not generated and vibration reduction effect contemplated by the invention is not exhibited.

In the present embodiment, the slit shroud and the ramp are constituted by separate parts, but they may be constituted by one part. Similarly, the slit shroud, the ramp and the narrow shroud may be constituted by one part.

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A vibration-suppressing mechanism for a disk drive, comprising:
 a disk having an axis of rotation, an outer circumferential edge spanning 360 degrees, and a vibration mode;
 a shroud having a shroud surface extending along and facing the outer circumferential edge of the disk, and the shroud surface has circumferential ends and a circumferential length that spans less than 180 degrees of the disk; wherein
 a gap between the outer circumferential edge of the disk and the shroud surface becomes narrow near a portion of the disk where vibration of the disk is to be suppressed to provide an aerodynamic damping force for the disk to vary the vibration mode of the disk, the portion of the disk is circumferentially spaced apart from the circumferential ends of the shroud surface, and the gap varies in radial width throughout the circumferential length of the shroud surface.

2. A vibration-suppressing mechanism for the disk drive according to claim 1, wherein when a minimum gap between the disk and the shroud is denoted by "d" and the radius of the disk by "r", the shroud surface is so formed that the ratio "d/r" is in a range of not larger than 0.002 but is not smaller than 0.0005.

3. A vibration-suppressing mechanism for the disk drive according to claim 1, wherein the portion where the shroud surface becomes narrow has an angle of not smaller than 90 degrees as measured with the axis of rotation as a center, and is so located as to include a line that connects the axis of rotation of the disk to the portion where the vibration is to be suppressed.

4. A vibration-suppressing mechanism according to claim 1, wherein an amplitude of the vibration near the portion where the vibration is to be suppressed is smaller than an average amplitude of the disk, and the amplitude at a position symmetrical to the portion where the vibration is to be suppressed with respect to the axis of rotation of the disk is larger than the average amplitude of the disk.

5. A vibration-suppressing mechanism according to claim 1, wherein vibration of the disk is decreased at the portion where the vibration of the disk is to be suppressed due to an increase in vibration on a side opposite to the portion where the vibration of the disk is to be suppressed.

6. A vibration-suppressing mechanism for the disk drive according to claim 1, wherein the gap is narrowest between the shroud surface and the outer circumferential edge of the disk on a radial line that connects the axis of rotation of the disk to the portion where the vibration is to be suppressed, the shroud surface being so formed that the gap gradually increases in both circumferential directions as it goes away from the portion.

7. A vibration-suppressing mechanism for the disk drive according to claim 6, wherein when a minimum gap between the disk and the shroud is denoted by "d" and the radius of the disk by "r", the shroud surface is so formed that the ratio "d/r" is in a range of not larger than 0.002 but is not smaller than 0.0005.

8. A vibration-suppressing mechanism according to claim 6, wherein the portion where the vibration of the disk is to be suppressed is a central portion of the shroud, the central portion being positioned on the radial line that extends through the axis of rotation and the portion of the disk where the vibration of the disk is to be suppressed.

9. A vibration-suppressing mechanism for the disk drive according to claim 6, wherein the gap increases symmetrically along both circumferential directions of the disk starting from the portion where the gap is the narrowest between the outer circumferential edge of the disk and the shroud surface.

10. A vibration-suppressing mechanism for the disk drive according to claim 9, wherein when a minimum gap between the disk and the shroud is denoted by "d" and the radius of the disk by "r", the shroud surface is so formed that the ratio "d/r" is in a range of not larger than 0.002 but is not smaller than 0.0005.

11. A magnetic disk drive, comprising:
a base;
a disk rotatably mounted to the base and having an axis of rotation, an outer circumferential edge spanning 360 degrees, and a vibration mode;
an actuator mounted to the base and having a head for reading data from the disk;
a shroud having a shroud surface extending along and facing the outer circumferential edge of the disk, and the shroud surface terminates at circumferential ends and has a circumferential length that spans less than 180 degrees of the disk;
a gap between the outer circumferential edge of the disk and the shroud surface becomes narrow near a portion of the disk where vibration of the disk is to be suppressed to provide an aerodynamic damping force for the disk to vary the vibration mode of the disk, the portion of the disk is circumferentially spaced apart from the circumferential ends of the shroud surface, and the gap varies in radial width throughout the circumferential length of the shroud surface; and
the portion where the shroud surface becomes narrow has an angle of not smaller than 90 degrees as measured with the axis of rotation as a center, and is so located as to include a line that connects the axis of rotation of the disk to the portion where the vibration is to be suppressed.

12. A magnetic disk drive according to claim 11, wherein when a minimum gap between the disk and the shroud is denoted by "d" and the radius of the disk by "r", the shroud surface is so formed that the ratio "d/r" is in a range of not larger than 0.002 but is not smaller than 0.0005.

13. A magnetic disk drive according to claim 11, wherein an amplitude of the vibration near the portion where the vibration is to be suppressed is smaller than an average amplitude of the disk, and the amplitude at a position symmetrical to the portion where the vibration is to be suppressed with respect to the axis of rotation of the disk is larger than the average amplitude of the disk.

14. A magnetic disk drive according to claim 11, wherein vibration of the disk is decreased at the portion where the vibration of the disk is to be suppressed due to an increase in vibration on a side opposite to the portion where the vibration of the disk is to be suppressed.

15. A magnetic disk drive according to claim 11, wherein the gap is narrowest between the shroud surface and the outer circumferential edge of the disk on a radial line that connects the axis of rotation of the disk to the portion where the vibration is to be suppressed, the shroud surface being so formed that the gap gradually increases in both circumferential directions as it goes away from the portion.

16. A magnetic disk drive according to claim 15, wherein the portion where the vibration of the disk is to be suppressed is a central portion of the shroud, the central portion being positioned on the radial line that extends through the axis of rotation and the portion of the disk where the vibration of the disk is to be suppressed.

17. A magnetic disk drive according to claim 15, wherein the gap increases symmetrically along both circumferential directions of the disk starting from the portion where the gap is the narrowest between the outer circumferential edge of the disk and the shroud surface.

* * * * *